United States Patent [19]

Litehizer, Jr.

[11] 4,189,799
[45] Feb. 26, 1980

[54] CABLE STRIPPING TOOL

[75] Inventor: Melvin P. Litehizer, Jr., Millersburg, Pa.

[73] Assignee: AMP Incorporated, Harrisburg, Pa.

[21] Appl. No.: 912,710

[22] Filed: Jun. 5, 1978

[51] Int. Cl.² .......................... B25F 1/00; H02G 1/12
[52] U.S. Cl. ..................................... 7/107; 81/9.5 B; 30/90.6
[58] Field of Search ............... 7/107, 163; 81/9.5 R, 81/9.5 B; 30/90.1, 90.6, 90.8, 91.2, 123

[56] References Cited

U.S. PATENT DOCUMENTS

| | | | |
|---|---|---|---|
| 1,490,459 | 4/1924 | Fergusson | 81/9.5 B |
| 2,806,325 | 9/1957 | Fox | 81/9.5 B X |
| 3,161,088 | 12/1964 | Tolman. | |
| 3,254,407 | 6/1966 | Apa et al. | |
| 3,304,605 | 2/1967 | Stark. | |
| 3,447,172 | 6/1969 | Clark | 7/107 |
| 3,710,406 | 1/1973 | Stanford | 7/107 |
| 3,796,115 | 3/1974 | Dane | 81/9.5 B |
| 4,049,213 | 6/1978 | Bradley. | |
| 4,049,214 | 6/1978 | Bradley. | |

*Primary Examiner*—James G. Smith
*Attorney, Agent, or Firm*—Russell J. Egan

[57] ABSTRACT

A tool is disclosed for stripping the insulation jacket from a cable, such as the electrical cable used in house wiring, and preparing the conductors for termination. The tool includes portions for slitting the cable, cutting off the slit jacket, stripping measured lengths of the conductors and stripping greater lengths of the conductors. It also includes wire ganging holes.

6 Claims, 3 Drawing Figures

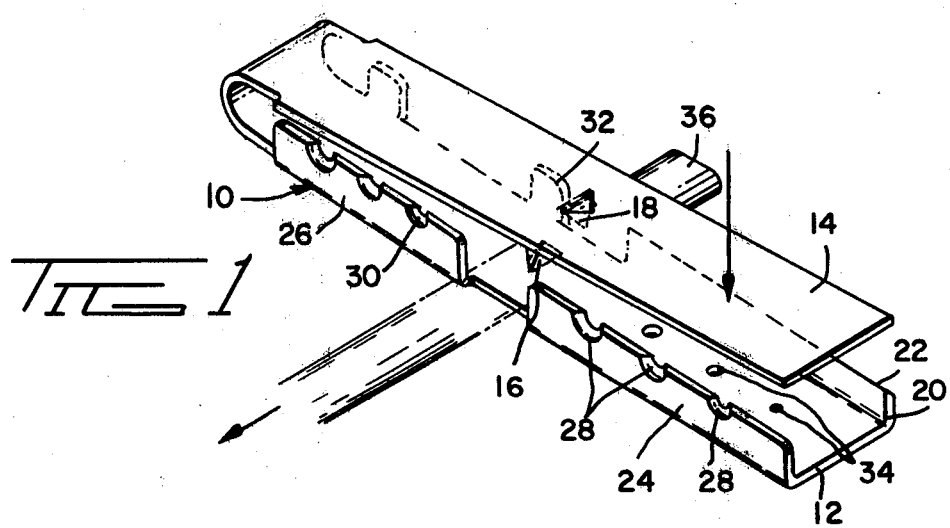
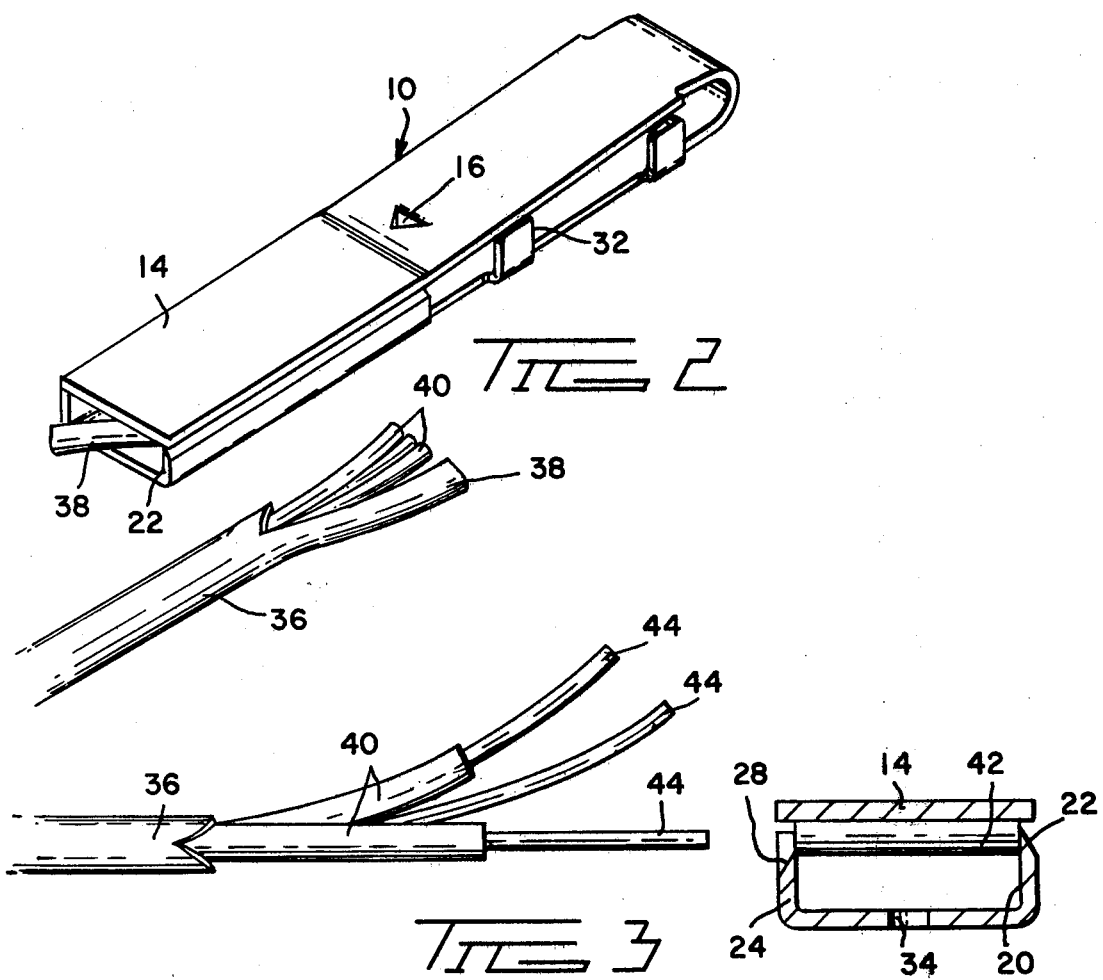

CABLE STRIPPING TOOL

BACKGROUND OF THE INVENTION

1. The Field Of The Invention

The present invention relates to a tool for stripping insulation from cables and conductors and in particular to a tool useful in preparing house wiring electric cable for termination.

2. The Prior Art

The conventional way that housewiring cable has been prepared for termination heretofore is to slit the outer insulating jacket with a pocket knife or the like, peel back the jacket, cut off the freed portion of the jacket, and then strip the insulation from the separate conductors. While this method was generally effective, it did have several undesirable side effects. For example, during the initial slicing of the jacket the insulation on the conductors could also be cut at undesired locations. Also the individual conductors could be stripped of too little or too much insulation. The first case would require repeating the stripping operation while the latter case would require trimming the conductor.

There have been several tools proposed to overcome the above problems. Some of these tools are disclosed in U.S. Pat. Nos. 2,818,641; 3,161,088; 3,254,407; and 3,304,605. These tools did not solve all of the problems either individually or collectively.

SUMMARY OF THE INVENTION

The subject tool is formed of a single elongated piece of spring steel folded upon itself forming opposing sides. A pair of slicing blades extend towards one another from the opposed sides of the tool and are slightly offset with respect to each other. First and second sets of semi-circular wire stripping recesses are formed in one upstanding edge of one side to be engaged by the opposite side of the tool. A measuring abutment extends from an opposite edge of said one side and has a sharpened free edge engageable by the opposite side of the tool. A series of ganging apertures are formed in one side of the tool.

It is therefore an object of the present invention to produce a cable stripping tool which can be used to prepare a housewiring electrical cable for termination.

It is another object of the invention to produce a tool which can both slice and cut off the insulation jacket of conventional housewiring electrical cable.

It is a further object of the present invention to produce a tool which can strip premeasured or greater lengths of insulation from conductors of conventional housewiring cable.

It is a still further object of the present invention to produce a tool for preparing housewiring electrical cable for termination, which tool can be readily and economically produced.

The means for accomplishing the foregoing objects and other advantages will become apparent to those skilled in the art from the following detailed description with reference to the accompanying drawings.

BRIEF DESCRIPTION OF THE DRAWINGS

FIG. 1 is a perspective view of the subject tool as it would be used to slice the insulation jacket of a housewiring electrical cable;

FIG. 2 is a perspective view of the subject tool as it would be used to cut the freed insulation jacket from the electrical cable; and FIG. 3 is a transverse section through the subject tool showing the operation of stripping insulation from an individual conductor of the cable.

DETAILED DESCRIPTION OF THE PREFERRED EMBODIMENT

The subject tool 10 is formed from a single elongated piece of spring steel preferably having a thickness in the range of 0.030" to 0.050". The tool is bent upon itself to have a cutting side 12 and a backup side 14. A slicing blade 16, 18 is inwardly formed from each respective side and is slightly offset from the opposing blade. Preferably the offset of the blades is substantially equal to the diameter of the ground wire of conventional three wire housewiring electrical cable. An abutment 20 is upwardly formed from one marginal edge of the cutting side and has a bevelled cutting surface 22 along the free edge thereof. The opposite marginal edge of the cutting side is upturned to form first and second spaced stripping portions 24, 26, respectively. Each stripping portion is provided, on its free edge, with a series of arcuate cutting recesses 28, 30 sized to receive the common 10, 12 and 14 gauge wire found in housewiring electrical cable. A further abutment 32 is formed on the first marginal edge spaced from the abutment 20. The tool is also provided with a plurality of wire gauging apertures 34.

The tool is used to prepare an electric cable for termination in the following manner. First, a cable 36 is inserted transversely in the tool into the space between the strippers 24, 26 and abutments 20, 32. This space is sized to align the ground wire of the cable beneath and between the blades 16, 18. The tool is then squeezed close so that blades 16, 18 pierce the insulation jacket 38 from opposite sides of the cable immediately adjacent the ground wire of the cable. The cable is then drawn through the tool, to the left as shown in FIG. 1, with the blades slicing the insulation jacket longitudinally to the end of the cable. Second, the freed jacket 38 is bent away from the wires 40 and inserted between the cutting edge 22 of the abutment 20 and the backup side 14. The tool is again squeezed to effect a transverse cutting of the insulation jacket 38. Third, the individual wires are inserted into an appropriate cutter 28, 30, of stripping portions 24, 26 and the tool squeezed and rotated around the wire to completely sever the insulation 42. The cut insulation 42 is stripped from the conductor 44 by pulling the wire cable 36 from the tool, to the left as shown in FIG. 3.

If the wire is inserted in cutter recesses 28 of stripping portion 24, it should be fully inserted until the free end strikes abutment 20. This will assure that a measured length of insulation will be stripped from the conductor. Conventionally ¾" of insulation is stripped from a wire for most terminations. If a longer length of bare conductor is desired, the cutter recesses 30 of stripping portion 26 are used. The gauging apertures 34 would be used to determine and/or check the conductor size.

The present embodiment may be subject to many changes and modifications without departing from the spirit or essential characteristics thereof. For example, a cutting edge could be formed on the backup side to achieve more of a shearing action in cutting the insulation jacket. The present embodiment should therefore be considered in all respects as illustrative and not restrictive of the scope of the invention.

What is claimed is:

1. A tool for preparing ends of housewiring cable for termination, said tool comprising:
   a unitary, elongated metal member folded upon itself to form a lower cutter portion and an upper backup portion;
   a series of gauging apertures formed in one of said lower or upper portions;
   a cutting blade formed in each said portion extending inwardly towards the opposite portion, said blades being transverse to the elongated dimension of said tool and being offset from each other sufficiently to be out of engagement;
   a first abutment upwardly turned along one marginal edge of said lower cutter portion, said abutment having a sharpened free edge; and
   at least one stripper portion upwardly turned along an opposite marginal edge of said lower cutter portion, said at least one stripper portion having at least one arcuate cutting surface in a free edge thereof, whereby insulation jacketing of said cable is slit by said blades and cut off by said abutment and insulation on individual conductors of said cable is stripped by said stripper.

2. A tool according to claim 1 wherein said elongated metal member is spring steel having a thickness in the range of 0.030" to 0.050".

3. A tool according to claim 1 wherein:
   said cutting blades are offset a distance substantially equal to the diameter of a ground wire found in conventional housewiring electrical cable.

4. A tool according to claim 1 further comprising:
   two said stripper portions on said opposite marginal edge, said stripper portions being spaced apart uniformly with respect to said blades defining a cable guide for said blades.

5. A tool according to claim 4 wherein said abutment lies opposite one of said stripper portions limiting the length of insulation stripped from a wire placed therebetween.

6. A tool according to claim 4 further comprising:
   a second abutment on said first marginal edge, said abutments being aligned with said stripper portions to define a cable guide on both sides of said tool.

* * * * *